United States Patent [19]

Lawrence

[11] 3,928,340

[45] Dec. 23, 1975

[54] N-[(SUBSTITUTED AMINO) THIO]-IMIDES

[75] Inventor: John P. Lawrence, Stow, Ohio

[73] Assignee: The Goodyear Tire & Rubber Company, Akron, Ohio

[22] Filed: Mar. 7, 1974

[21] Appl. No.: 448,856

Related U.S. Application Data

[62] Division of Ser. No. 266,008, June 26, 1972, Pat. No. 3,838,114.

[52] U.S. Cl.................. 260/247.1L; 260/247.1M 260/293.61; 260/293.69; 260/293.71; 260/326 S; 260/326.5 S

[51] Int. Cl.² ............. C07D 209/48; C07D 401/12; C07D 403/12; C07D 413/12

[58] Field of Search.... 260/247.1 L, 326.5 S, 268 S, 260/293.71, 293.61, 293.69, 326 S

[56] References Cited
UNITED STATES PATENTS

| | | | |
|---|---|---|---|
| 2,902,402 | 9/1959 | Lambrech et al. | 260/268 S |
| 3,071,592 | 1/1963 | Ladd | 260/326.5 S |
| 3,178,447 | 4/1965 | Kohn | 260/326.5 S |
| 3,410,842 | 11/1968 | Allais et al. | 260/326.5 S |
| 3,525,737 | 8/1970 | Kern et al. | 260/326.5 S |
| 3,546,185 | 12/1970 | Coran et al. | 260/326.5 S |

FOREIGN PATENTS OR APPLICATIONS 1,355,802   6/1974   United Kingdom

*Primary Examiner*—Anton H. Sutto
*Assistant Examiner*—Michael Shippen
*Attorney, Agent, or Firm*—F. W. Brunner; J. A. Rozmajze

[57] ABSTRACT

Imides such as N-(morpholinothio)phthalimide are used to affect the vulcanization characteristics of sulfur vulcanizable polymers by increasing the state of vulcanization and/or improving scorch resistance and/or increasing the rate of vulcanization.

2 Claims, No Drawings

N-[(SUBSTITUTED AMINO) THIO]-IMIDES

This is a divisional application of application Ser. No. 266,008 filed June 26, 1972, which issued on Sept. 24, 1974 as U.S. Pat. No. 3,838,114.

This invention relates to compounds which generally function to increase the state (degree) of vulcanization when used during the sulfur vulcanization of rubbers by donating sulfur to the system. This invention also relates to compounds which provide a vulcanizable polymer with balanced processing and vulcanization characteristics. In addition, it relates to compounds which retard vulcanization during the processing of vulcanizable rubbery compositions. It also relates to compounds which function as activators, that is, secondary accelerators in sulfur type vulcanization systems. It also relates to processes for increasing the state of vulcanization of sulfur vulcanizable rubbery compositions and either increasing scorch delay periods and/or increasing vulcanization rates. It also relates to the vulcanized products resulting therefrom.

The physical properties of a vulcanized composition are related to its state of vulcanization. Often, as the state of vulcanization is increased, certain physical properties are improved. Rubber additives such as sulfur donors can be used therefore to increase the state of vulcanization or to permit the use of lesser amounts of free sulfur.

Scorching during the processing of rubber is due to the premature or insipient vulcanization which can occur during any of the steps involved in the processing of the rubber prior to the final vulcanization step or during storage between said processing steps. Whereas a properly compounded unscorched rubber formulation can be die extruded or sheeted smoothly from a calender without lumping, a scorched material often becomes wavy or lumpy after sheeting and must be discarded. It is therefore desirable that rubber additives be used which reduce scorching. Such compounds are commonly referred to as retarders.

It is often desirable to increase the rate at which rubbery compositions are vulcanized. Sulfur vulcanizable rubbery compositions containing free sulfur are made to vulcanize more rapidly by the addition of an accelerator compound. Often the accelerator compound is referred to as a primary accelerator and is used in combination with another accelerator called an activator or secondary accelerator which further increases the vulcanization rate.

It is an object of this invention to provide sulfur donors which will increase the state of vulcanization of vulcanized rubbery polymers as well as compounds which are secondary accelerators (activators) and/or retarders (scorch inhibitors). Another object of the present invention is to provide processes which will improve the scorch resistance and rate of vulcanization of vulcanizable rubbery polymers and also the state of vulcanization of sulfur vulcanized rubbers.

The objects of the present invention are accomplished by a sulfur vulcanizable combination of a sulfur vulcanizable rubber and at least one compound having the following structural formulae

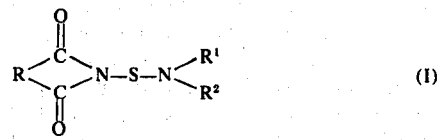

and

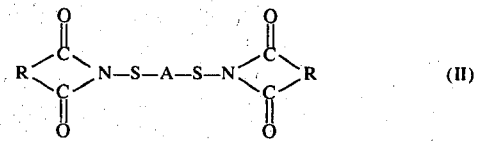

wherein A is an N,N'-disubstituted radical selected from the group consisting of
a. an N,N'-disubstituted radical which is a derivative of a heterocyclic diamine,
b.

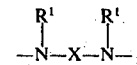

and
c.

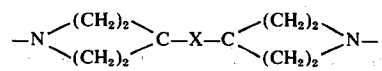

wherein R is a saturated or olefinic divalent aliphatic radical having 1 to 7 carbon atoms, such as an alkylene radical or alkenylene radical or a saturated or olefinic divalent cyclic aliphatic radical having 5 to 10 carbon atoms such as a cycloalkylene, cycloalkenylene, or arylene radical having 6 to 10 carbon atoms and wherein $R^1$ and $R^2$ are selected from the group consisting of alkyl radicals having 1 to 20 carbon atoms, cyano alkyl radicals having 2 to 21 carbon atoms, cycloalkyl radicals having 5 to 20 carbon atoms, aralkyl radicals having 7 to 20 carbon atoms and aryl radicals (e.g., phenyl, p-tolyl, alkoxyaryl, haloaryl and nitroaryl) having 6 to 20 carbon atoms, wherein $R^1$ and $R^2$ can be joined through a member of the group consisting of —CH₂—, —O—, and —S— to constitute with the attached nitrogen atom a heterocyclic ring, and wherein X is selected from the group consisting of alkylene radicals having 2 to 10 carbon atoms, cycloalkylene radicals having 5 to 10 carbon atoms and arylene radicals having 6 to 10 carbon atoms.

Preferably R is 4,5-cyclohexenylene, orthophenylene, ethylene, or 1,3-propylene. Preferably

is morpholino, 2,6-dimethylmorpholino, piperidino, diethylamino, diisopropylamino, 3-methylpiperidino, t-butylamino, dicyclohexylamino, N-β-cyanoethylcyclohexylamino, N-β-cyanoethyl-t-butylamino, N-β-cyanoethyl-n-butylamino, N-phenylcyclohexylamino, N-methylanilino, N-ethylanilino, N-ethylbenzylamino, dibenzylamino, N-phenylbenzylamino, N-cyanomethylcyclohexylamino, and N-cyanomethyl-n-butylamino.

Preferably when A is an N,N'-disubstituted radical which is a derivative of a heterocyclic diamine, the diamine is piperazine, imidazolidine, hexahydropyrimidine, or homopiperazine, said amines (radicals) being unsubstituted or substituted on the ring carbons by methyl groups, the total number of methyl groups being less than three. It should be understood that the above radicals need not actually be derived from the above diamines but need only be the radicals which can be derived from said diamines. That is, the compounds are not limited to their method of preparation.

More preferably A is piperazine, 2,5-dimethylpiperazine, imidazolidine, hexahydropyrimidine, homopiperazine, N,N'-dimethylethylenediamine, N,N'-dimethyl-1,3-propylenediamine, N,N'-dimethyl-1,6-hexamethylenediamine, N,N'-dimethyl-1,4-cyclohexylenediamine, N,N'-dimethyl-p-phenylenediamine, 4,4'-ethylenedi(piperidine), 4,4'-trimethylenedi(piperidine), 4,4'-tetramethylenedi(piperidine) or 4,4'-hexamethylenedi(piperidine).

Compounds which act both as retarders and activators in SBR include compounds where R is orthophenylene or 1,2-cyclohex-4-enylene and

is morpholino, N-phenylcyclohexylamino, N-β-cyanoethylcyclohexylamino, N-β-cyanoethyl-n-butylamino, N-ethylbenzylamino or N-cyanomethylcyclohexylamino. Where R is one of the two radicals described above and

is N-phenylbenzylamino the compounds are retarders.

The following compounds illustrate, but do not limit, the imides of the present invention.
N-(morpholinothio)-phthalimide
N-(2,6-dimethylmorpholinothio)-phthalimide
N-(piperidinothio)-phthalimide
N-(3-methylpiperidinothio)-phthalimide
N-(4-methylpiperidinothio)-phthalimide
N-(pyrrolidinothio)-phthalimide
N-(diethylaminothio)-phthalimide
N-(di-n-propylaminothio)-phthalimide
N-(diisopropylaminothio)-phthalimide
N-(di-n-butylaminothio)-phthalimide
N-(diisobutylaminothio)-phthalimide
N-(di-n-hexylaminothio)-phthalimide
N-(di-n-octylaminothio)-phthalimide
N-(dicyclohexylaminothio)-phthalimide
N-(N'-methylcyclohexylaminothio)-phthalimide
N-(dibenzylaminothio)-phthalimide
N-(morpholinothio)-cisΔ$^4$-tetrahydrophthalimide
N-(morpholinothio)-succinimide
N-(piperidinothio)-succinimide
N-(morpholinothio)-maleimide
N-(dibenzylaminothio)-maleimide
N-(morpholinothio)-glutarimide
N-(2,6-dimethylmorpholinothio)-glutarimide
N-(morpholinothio)-1,8-naphthalimide
N-(N'-methylcyclohexylaminothio)-1,8-naphthalimide
N-(morpholinothio)-hexahydrophthalimide
N-(di-n-propylaminothio)-hexahydrophthalimide
N-(morpholinothio)-adipimide
N-(4-methylpiperidinothio)-adipimide
N-(morpholinothio)-5,5-dimethylglutarimide
N-(3-methylpiperidinothio)-5,5-dimethylglutarimide
N-(morpholinothio)-[2.2.1]-bicyclohept-4-ene-2,3-dicarboximide
N-(morpholinothio)-malonimide
N-(N'-phenylcyclohexylaminothio)-phthalimide
N-(N'-β-cyanoethylcyclohexylaminothio)-phthalimide
N-(N'-β-cyanoethyl-n-butylaminothio)-phthalimide
N-(N'-ethylbenzylaminothio)-phthalimide
N-(N'-phenylbenzylaminothio)-phthalimide
N-(N'-cyanomethylcyclohexylaminothio)-phthalimide
N,N'-dimethyl-N,N'-bis(phthalimidothio)-ethylenediamine
N,N'-dimethyl-N,N'-bis(phthalimidothio)-1,3-propylenediamine
N,N'-dimethyl-N,N'-bis(phthalimidothio)-1,6-hexamethylenediamine
N,N'-dimethyl-N,N'-bis(phthalimidothio)-1,4-cyclohexanediamine
N,N'-dimethyl-N,N'-bis(phthalimidothio)-p-phenylenediamine
1,4-Bis(phthalimidothio)-piperazine
1,4-Bis(phthalimidothio)-homopiperazine
1,4-Bis(phthalimidothio)-2,5-dimethylpiperazine
1,3-Bis(phthalimidothio)-imidazolidine
1,3-Bis(phthalimidothio)-hexahydropyrimidine
4,4'-Ethylenedi(piperidinothio)-bis-(phthalimide)
4,4'-Tetramethylenedi(piperidinothio)-bis(phthalimide)
4,4'-Hexamethylenedi(piperidinothio)-bis(phthalimide)

When used with a conventional primary accelerator and sulfur, the compounds of structural formula (I) provide a vulcanizable polymer with balanced processing and vulcanization characteristics. In many vulcanization systems they provide both improved scorch resistance and improved activation characteristics. In systems where they provide only improved scorch resistance or improved activation characteristics, they do so without adversely affecting the scorch resistance or conversely the activation characteristics. This is unique in that conventional retarders normally adversely affect vulcanization rates, much less improve the rate; while conventional activators normally adversely affect scorch, much less improve scorch resistance. Whether these compounds act as both activators and retarders, or just as an activator, or just as a retarder, is not only dependent upon the primary accelerator being used but also upon the particular polymer being vulcanized as well as the particular sulfur donor compound of the present invention being used. The effect of accelerator systems, polymeric environment and different sulfur donor compounds is illustrated herein. It should be noted, however, that regardless of the accelerator system used or the particular polymer vulcanized, the compounds almost always act as sulfur donors. In any case, the imides of the present invention will act at least as one of the following; a sulfur donor, an activator or a retarder.

The amides of the present invention can be prepared by the reaction of an aminesulfenyl chloride with an alkali metal salt of an amide. Alternatively, the aminesulfenyl chloride may be reacted with an imide in the presence of an organic acid acceptor such as pyridine or triethylamine. The aminesulfenyl chlorides, in turn, may be prepared using any of the available methods described in the literature, for example, by chlorination of an N,N'-dithiobis(amine), [German Patent 965,968 (1954)], or by the reaction of a secondary amine with sulfur dichloride in the presence of an organic acid acceptor [German Patent 1,131,222 (1962)]. Generally a solution of the aminesulfenyl chloride in an inert solvent is added to a solution or suspension of the imide (or its alkali metal salt), also in an inert solvent.

Alternatively, the imides can be prepared by reaction of an imide-N-sulfenyl chloride with an appropriate amine in the presence of an organic acid acceptor such as triethylamine or pyridine, or an excess of the amine which is entering into the reaction with the imide-N-sulfenyl chloride. The imide-N-sulfenyl chlorides, in turn, are readily prepared as described in the literature by reaction of an imide with sulfur dichloride in the presence of an organic acid acceptor [U.S. Pat. No. 3,539,538 (1970)]. Generally, an amine is added to a solution of the imide-N-sulfenyl chloride in an inert solvent.

The performance of the compounds of the present invention as retarders, activators or in increasing the state of vulcanization is not dependent upon their method of preparation.

The imides of the present invention can be used with any conventional compounding additive such as carbon black, zinc oxide, antidegradants and stearic acid. They can be used in a sulfurless system with an accelerator (a sulfur donor or otherwise), preferably a primary accelerator, or with a sulfur vulcanization agent in the presence of an accelerator. For the purposes of this invention, sulfur vulcanizing agent means elemental sulfur (free sulfur) or sulfur donating vulcanizing agents, for example, an amine disulfide or a polymeric polysulfide. Preferably the imides are used with both a sulfur vulcanization agent, preferably free sulfur, and an accelerator, preferably a primary accelerator. The invention is applicable to vulcanization accelerators of various classes using conventional accelerator levels. Regardless of what accelerator is used, the imides will still normally act as sulfur donors. For example, rubber mixes containing the aromatic thiazole accelerators which include N-cyclohexyl-2-benzothiazolesulfenamide, 2-mercaptobenzothiazole, N-tert-butyl-2-benzothiazolesulfenamide, 2-benzothiazolyl diethyldithiocarbamate and 2-(morpholinothio)-benzothiazole can be used. Other thiazole accelerators which may be used include 2-(aminodithio)-thiazoles and 2-(aminotrithio)-thiazoles such as 2-(morpholinodithio)-benzothiazole. Amine salts of mercaptobenzothiazole accelerators, for example, the t-butylamine salt of mercaptobenzothiazole, and like salts of morpholine and 2,6-dimethylmorpholine can be used in the invention. Thiazole accelerators other than aromatic can be used. Stocks containing accelerators, for example, tetramethylthiuram disulfide, tetramethylthiuram monosulfide, aldehyde amine condensation products, thiocarbamylsulfenamides, thioureas, xanthates, and guanidine derivatives are substantially improved using the process of the present invention.

The imides of the invention can be used in any sulfur vulcanizable rubber including natural and synthetic rubbers and mixtures thereof. Synthetic rubbers that can be improved by the process of this invention include homopolymers and copolymers of dienes, both conjugated and nonconjugated, e.g., 1,3-dienes such as 1,3-butadiene and isoprene. Examples of such synthetic rubbers include neoprene (polychloroprene), cis-1,4-polybutadiene, cis-1,4 polyisoprene, butyl rubber, copolymers of 1,3-butadiene or isoprene with monomers such as styrene, acrylonitrile and methyl methacrylate. Ethylene/propylene terpolymers, for example ethylene/propylene/dicyclopentadiene terpolymers also benefit from the practice of the present invention.

The imides can be added to the rubbers by any conventional technique such as milling or Banburying.

All of the working examples herein are intended to illustrate but not limit the scope of the present invention. Unless indicated otherwise, all parts are parts by weight.

The following examples, 1 to 7, illustrate the preparation of various imides of the present invention, and are not intended to limit the scope of the present invention.

EXAMPLE 1

To prepare N-(morpholinothio)-phthalimide, 0.50 mole of chlorine gas was added during one-half hour to a mixture of 118.0 grams of 4,4'-dithiobis(morpholine) in 500 ml. of toluene at 0°–5° C. The resulting solution of morpholinesulfenyl chloride was added during 1 hour to a mixture of 147 grams (1.0 mole) phthalimide, 120 grams (1.2 mole) triethylamine, and one liter tetrahydrofuran at 10°–15° C. After one hour, the mixture was poured into 1.5 liters of water, the insoluble solid filtered, washed on the filter with water, and recrystallized from 2-propanolbenzene to afford 161.3 grams (61.0%) of the product having a melting point of 210°–212° C. Analysis of the product showed 10.55 percent nitrogen and 12.13 percent sulfur. The percentages calculated for $C_{12}H_{12}N_2O_2S$ were 10.68 percent nitrogen and 12.12 percent sulfur.

EXAMPLE 2

To prepare N-(diethylaminothio)-phthalimide, 0.20 mole of chlorine gas was added during 15 minutes to a solution of 41.5 grams (0.20 mole) N,N'-dithiobis(diethylamine) in 100 ml. of carbon tetrachloride at 0°–5° C. The resulting solution of diethylaminesulfenyl chloride was added dropwise to a mixture of 58.7 grams (0.40 mole) phthalimide, 48.5 grams (0.48 mole) triethylamine, and 250 ml. of tetrahydrofuran at 0°–10° C. After one-half hour, the mixture was poured into three liters of water, extracted with chloroform, the combined extracts dried over anhydrous magnesium sulfate, and concentrated in vacuo. The resulting solid residue was recrystallized twice from methanol, then stirred for ten minutes in 350 ml. of ice cold one percent sodium hydroxide, filtered, washed on the filter with water and dried in vacuo. The yield of product was 36.7 grams (36.7%) with a melting point of 73°–75° C. Analysis showed 11.06 percent nitrogen and 12.9 percent sulfur. The percentages calculated for $C_{12}H_{14}N_2O_2S$ were 11.20 percent nitrogen and 12.8 percent sulfur.

EXAMPLE 3

To prepare N-(piperidinothio)-phthalimide, 0.20 mole of chlorine gas was added to a solution of 46.4 grams (0.20 mole) N,N'-dithiobis(piperidine) in 100 ml. of carbon tetrachloride during 15 minutes at 0°–5° C. The resulting solution of piperidinesulfenyl chloride was added dropwise during twenty minutes to a mixture of 58.7 grams (0.40 mole) phthalimide, 48.5 grams (0.48 mole) triethylamine, and 450 ml. of tetrahydrofuran at 0°–10° C. After one hour, the mixture was poured into 2.5 liters of water, sufficient chloroform added to dissolve the insoluble solid, the lower layer drawn off, dried over anhydrous magnesium sulfate, and concentrated in vacuo. The resulting solid residue was recrystallized twice from 2-propanol-benzene, then stirred for ten minutes in 550 ml. of ice cold 0.5 percent sodium hydroxide, filtered, washed on the filter with water and dried in vacuo. The yield of product was 62.5 grams (59.6%) with a melting point of 177°–179° C. Analysis showed 10.57 percent nitrogen and 10.8 percent sulfur. The percentages calculated for $C_{13}H_{14}N_2O_2S$ were 10.69 percent nitrogen and 12.2 percent sulfur.

EXAMPLE 4

To prepare N-(diisopropylaminothio)-phthalimide, 0.25 mole of chlorine gas was added to a solution of 67.1 grams (0.25 mole) N,N'-dithiobis(diisopropylamine) in 100 ml. of carbon tetrachloride during fifteen minutes at 0°–5° C. The resulting solution of diisopropylaminesulfenyl chloride was added dropwise during one-half hour to a stirred mixture of 74.5 grams (0.50 mole) phthalimide, 61.6 grams (0.62 mole) triethylamine and 250 ml. of tetrahydrofuran at 0°–10° C. After one hour the mixture was poured into three liters of water, extracted with chloroform, the combined extracts dried over anhydrous magnesium sulfate, and concentrated in vacuo. The oily solid residue was slurried in hexane, filtered, then stirred in 650 ml. of ice cold 0.5 percent sodium hydroxide for ten minutes, refiltered, washed with water, and recrystallized twice from methanol. The yield of product was 64.5 grams (45.6%) with a melting point of 98°–100° C. Analysis showed 9.94 percent nitrogen and 11.4 percent sulfur. The percentages calculated for $C_{14}H_{18}N_2O_2S$ were 10.07 percent nitrogen and 11.5 percent sulfur.

EXAMPLE 5

To prepare N-(morpholinothio)-cis-$\Delta^4$-tetrahydrophthalimide, 0.10 mole of chlorine gas was added to a solution of 23.6 grams (0.10 mole) 4,4'-dithiobis(morpholine) in 100 ml. of ethylene dichloride during ten minutes at 0°–5° C. The resulting solution of morpholinesulfenyl chloride was added dropwise to a mixture of 30.2 grams (0.20 mole) cis-$\Delta^4$-tetrahydrophthalimide, 24.2 grams (0.24 mole) triethylamine, and 250 ml. of ethylene dichloride. After one hour the reaction mixture was filtered, the filtrate concentrated in vacuo, the solid residue slurried in heptane, refiltered, and recrystallized from 2-propanolbenzene. The product was further purified by stirring for one-half hour in 200 ml. of 25 percent potassium carbonate, filtering, washing with water, and drying in vacuo. The yield of product was 27.0 grams (50.5%) with a melting point of 142°–145° C. Analysis showed 10.47 percent nitrogen and 11.83 percent sulfur. The percentages calculated for $C_{12}H_{16}N_2O_3S$ were 10.45 percent nitrogen and 11.94 percent sulfur.

The other compounds included within the practice of the present invention can be prepared by using the same or similar techniques as described in the preceding working examples. Synthetic routes to these compounds are not limited, however, to these particular reactions and procedures.

Tables I, II, III and IV illustrate the use of various imides of the present invention with different rubber stocks. The compositions are intended only to be illustrative of the practice of the present invention and not limiting. Mooney Scorch tests were performed using the large rotor as described in ASTM D 1646–61. A recorder was employed to continuously plot viscosity versus time. The number of minutes ($t\Delta 5$) required for the viscosity curve to rise five points above the minimum was taken as a measure of scorch inhibition. Larger values for ($t\Delta 5$) indicate a greater resistance to scorch or premature vulcanization.

Data on vulcanizing characteristics were obtained with a Monsanto Oscillating Disc Rheometer, as described by Decker, Wise, and Guerry in *Rubber World*, page 68, December 1962. Pertinent data from this instrument are: $t_4$, the minutes required for the Rheometer torque curve to rise four units above the minimum torque value, and $t_{90}$, the minutes required for the torque curve to reach 90 percent of the difference between the maximum and minimum torque values.

The $t_{90}$ value is considered to be the time required to reach the optimum vulcanized state. The difference, ($t_{90} - t_4$) is indicative of the time necessary for actual vulcanization to take place after the scorch delay period has ended, i.e., is a relative measure of vulcanization rate. Compounds which increase $t_4$, but do not greatly increase ($t_{90} - t_4$) are preferred since these impart processing safety, yet do not require greatly extended vulcanization times.

$\Delta Rh$ is the difference between the maximum and minimum torque obtained on the rheometer curve. It is used as a measure of the degree (state) of vulcanization.

The following examples 6 to 26 illustrate the use of the sulfur donors of the present invention in both natural rubber and SBR (butadiene/styrene elastomer). Stock A was used in examples 6 to 15 while Stock B was used in examples 16 to 26. Both stocks were run with no imide (control), 0.5 part and 1.0 part of the imide.

Table I

| | Stock A (parts) | Stock B (parts) |
|---|---|---|
| SBR 1712 | — | 137.5 |
| Smoked sheets | 100 | — |
| Carbon black | 50 | 68 |
| Stearic acid | 3 | 1.5 |
| Wax | 3 | — |
| Zinc oxide | 3 | 5 |
| Amine antioxidant | 1 | — |
| Sulfur | 2.5 | 1.5 |
| 2-(Morpholinodithio)-benzothiazole | 0.5 | 1 |
| Imide | 0–0.5–1.0 | 0–0.5–1.0 |

The results obtained using Stock A are listed in Table III and the results using Stock B in Table IV. The rheometer data was obtained at a temperature of 275° F. in natural rubber and 302° F. in SBR. The Mooney Scorch data was determined at 250° F. in natural rubber and 270° F. in SBR.

The effect of the imides was measured by comparison with the control, i.e., the stock with no imide present. Ratios of the measurements for the imide compounded stocks over the measurements for the control stock are listed in the tables. The $c$ subscript indicates that the measurement was made on the control stock. Values of $\Delta Rh/\Delta Rh_c$ which are over 1.00 indicate that the imide has increased the state of vulcanization. Values of $(t_{90} - t_4)/(t_{90} - t_4)_c$ which are less than 1.0, indicate an activating effect of the imide on the vulcanization rate. Values of $t\Delta_5/t\Delta_{5c}$ which are over 1.0 indicate that the imide has increased the scorch delay time, i.e., increased scorch resistance.

Table II contains a list of the various imides evaluated.

Table II

| | Imide |
|---|---|
| A | N-(morpholinothio)-phthalimide |
| B | N-(diethylaminothio)-phthalimide |
| C | N-(piperidinothio)-phthalimide |
| D | N-(diisopropylaminothio)-phthalimide |
| E | N-(morpholinothio)-cis-$\Delta^4$-tetrahydrophthalimide |
| F | N-(N'-phenylcyclohexylaminothio)-phthalimide |
| G | N-(N'-$\beta$-cyanoethylcyclohexylaminothio)-phthalimide |
| H | N-(N'-$\beta$-cyanoethyl-n-butylaminothio)-phthalimide |
| I | N-(N'-ethylbenzylaminothio)-phthalimide |
| J | N-(N'-phenylbenzylaminothio)-phthalimide |
| K | N-(N'-cyanomethylcyclohexylaminothio)-phthalimide |

Table III

| | | Natural Rubber | | | | | |
|---|---|---|---|---|---|---|---|
| | | $\Delta Rh/\Delta Rh_c$ (parts) | | $(t_{90}-t_4)/(t_{90}-t_4)_c$ (parts) | | $t\Delta5/t\Delta5_c$ (parts) | |
| Exp. | Imide | 0.5 | 1.0 | 0.5 | 1.0 | 0.5 | 1.0 |
| 6 | A | 1.14 | 1.20 | 1.09 | 1.00 | 1.50 | 1.75 |
| 7 | C | 1.20 | 1.31 | 0.84 | 0.92 | 1.24 | 1.45 |
| 8 | D | 1.13 | 1.19 | 0.91 | 0.84 | 0.90 | 0.87 |
| 9 | E | 1.14 | 1.23 | 0.85 | 0.87 | 1.32 | 1.45 |
| 10 | F | 1.03 | 1.04 | 1.05 | 1.13 | 1.16 | 1.41 |
| 11 | G | 1.05 | 1.13 | 0.93 | 0.97 | 1.27 | 1.55 |
| 12 | H | 1.11 | 1.18 | 0.87 | 0.93 | 1.42 | 1.65 |
| 13 | I | 1.15 | 1.21 | 0.85 | 0.88 | 1.36 | 1.50 |
| 14 | J | 1.02 | 1.08 | 0.99 | 1.04 | 1.27 | 1.47 |
| 15 | K | 1.12 | 1.19 | 1.02 | 1.04 | 1.27 | 1.47 |

Table IV

| | | SBR | | | | | |
|---|---|---|---|---|---|---|---|
| | | $\Delta Rh/\Delta Rh_c$ (parts) | | $(t_{90}-t_4)/(t_{90}-t_4)_c$ (parts) | | $t\Delta5/t\Delta5_c$ (parts) | |
| Exp. | Imide | 0.5 | 1.0 | 0.5 | 1.0 | 0.5 | 1.0 |
| 16 | A | 1.09 | 1.20 | 0.78 | 0.74 | 1.26 | 1.42 |
| 17 | B | 1.14 | 1.24 | 0.65 | 0.53 | 0.92 | 0.97 |
| 18 | C | 1.09 | 1.15 | 0.63 | 0.51 | 0.90 | 0.98 |
| 19 | D | 1.10 | 1.15 | 0.73 | 0.62 | 0.90 | 0.87 |
| 20 | E | 1.05 | 1.13 | 0.87 | 0.76 | 1.05 | 1.18 |
| 21 | F | 0.99 | 0.98 | 0.94 | 0.90 | 1.12 | 1.20 |
| 22 | G | 1.03 | 1.04 | 0.90 | 0.78 | 1.19 | 1.27 |
| 23 | H | 1.01 | 1.05 | 0.83 | 0.73 | 1.20 | 1.29 |
| 24 | I | 0.98 | 1.07 | 0.79 | 0.63 | 1.12 | 1.22 |
| 25 | J | 1.02 | 1.03 | 1.02 | 0.98 | 1.05 | 1.18 |
| 26 | K | 1.06 | 1.11 | 0.93 | 0.95 | 1.06 | 1.15 |

As shown in Table III, all of the compounds acted as sulfur conors. Most of the compounds acted as retarders. Also most acted as activators. All of the compounds either performed as an activator or a retarder.

As shown in Table IV, all but two compounds acted as sulfur donors, and these two acted as both activators and retarders. The three compounds which did not act as retarders, did act as activators, and the compound which did not act as an activator, acted as a retarder.

N-(morpholinothio)-phthalimide was used in carbon black loaded natural rubber (smoked sheet) with 2.5 parts of sulfur at both the 0.5 and 1.0 part level, with 2-(morpholinodithio)-benzothiazole (0.5 part) in one instance and 0.5 part of 2-(2,6-dimethylmorpholinothio)-benzothiazole in another. In the former case, the imide acted as a sulfur donor and retarder. In the latter instance, it acted as a sulfur donor, activator and retarder. The imide was also used with 0.5 part of three other accelerators separately. When used with 2-(morpholinothio)-benzothiazole and N-cyclohexyl-2-benzothiazolesulfenamide, in both instances it acted as a sulfur donor, a retarder and an activator. When used with N-t-butyl-2-benzothiazolesulfenamide, it acted as a sulfur donor and a retarder, while having only a small adverse effect on the vulcanization rate.

N-(morpholinothio)-phthalimide was used in various other carbon black loaded stocks containing free sulfur. In an NBR (butadiene/acrylonitrile) stock and a cis-1,4 polyisoprene stock, it was used with a primary/secondary accelerator system and sulfur. In both cases the state of vulcanization and scorch delay period were increased. In a natural rubber/SBR cis-1,4 polybutadiene blend it was used with a primary accelerator and sulfur and increased the state and rate of vulcanization and the scorch delay time. It was also used in a natural rubber composition containing sulfur and a primary accelerator using various activators (secondary accelerators). It provided an increased rate and state of vulcanization. It was also used with free sulfur and a primary accelerator in a natural rubber/SBR blend and in a cis-1,4 polybutadiene composition. In both cases the rate and state of vulcanization were increased along with the scorch delay period. It was also used in natural rubber with both sulfur and a primary accelerator using diphenylguanidine in one case as a secondary accelerator and tetramethylthiuram disulfide in another instance. In both cases a higher state of vulcanization and increased scorch delay time were obtained.

The amide (0.5 part) was also used in a carbon black loaded smoked sheet composition, in one instance with benzothiazyl disulfide (0.5 part), and in another instance with 0.5 part of 2-mercaptobenzothiazole. In both instances the imide increased the rate and state of vulcanization and acted as a retarder.

The imide was also used in a smoked sheet natural rubber composition at both the 0.5 and 1.0 part levels, in one instance with 1.0 part of 2-(morpholinothio)-benzothiazole and in another instance with 1.0 part of 2-mercaptobenzothiazole. In every instance the imide acted to increase the state of vulcanization. Also, in every instance it increased the rate of vulcanization with one exception (the sulfenamide at the 1.0 part level). With the sulfenamide it also acted as a retarder. It was also used at the 0.5 and 1.0 part levels with the 2-(morpholinothio)-benzothiazole in combination with sulfur (2.75 part) and tetramethylthiuram disulfide. In both instances it increased the state of vulcanization and the scorch delay time.

A natural rubber composition was cured without sulfur using 1, 1.5, and 2.0 parts of the imide along with, in one instance, 0.5 part of 2-(morpholinodithio)-benzothiazole and in another instance with 2-(morpholinothio)-benzothiazole. In each instance the state of vulcanization and scorch delay period were increased.

The above examples are not intended to be limiting but rather illustrative. Any of the sulfur donors, accelerators and rubbers described earlier herein can be substituted in the preceding examples. In addition, the levels of the sulfur donors and other components in said examples could be altered in accordance with the general teachings herein.

The additives of this invention can be used at various concentrations as low as 0.25 part per 100 parts by weight of rubber and even as low as 0.10 or even 0.05 part. Conventional levels would frequently be 0.5 and 1.0 part, although levels as high as 1.5, 3.0, 5.0 and even 10 parts can be used. Most frequently the concentration ranges from 0.25 to 5.0 parts, more preferably from 0.25 to 3.0 parts and most preferably from 0.25 to 1.50 parts.

The sulfur donor compounds of the present invention are preferably added to the rubbery polymer at the same time that the accelerator is added, although this order of addition is not necessary to the successful utilization of the compounds of this invention.

The compounds of the present invention are effective in the presence of organic accelerators whether they are diarylguanidines such as diphenylguanidine, or thiazoles, more specifically benzothiazyl amino disulfides, such as 2-(morpholinodithio)-benzothiazole, or thiazoles (also sulfenamides), more specifically thiazolesulfenamides, and even more specifically benzothiazolesulfenamides such as 2-(morpholinothio)-benzothiazole and N-cyclohexyl-2-benzothiazolesulfenamide, i.e., regardless of what type of organic accelerator is used. Thiuram sulfides such as tetramethylthiuram monosulfide and disulfide and tetraethylthiuram monosulfide and disulfide may also be used as well as other benzothiazolesulfenamides such as N-(t-butyl)-2-benzothiazolesulfenamide.

Various organic accelerators useful within the practice of this invention are described and illustrated in the *Vanderbilt Rubber Handbook*, 1968 Edition, R. T. Vanderbilt Company, Inc., particularly at pages 242 and 244 and also in the bulletin of the Elastomer Chemicals Dept. of the E. I. Du Pont de Nemours and Co. (inc.) entitled, "Accelerators, vulcanizing Agents and Retarders, Brochure No. SD A54457."

The polymers in which the imides of the present invention are incorporated remain suitable for their art recognized uses, e.g., in tires and industrial products.

Compounds referred to earlier herein as being retarders and/or activators in natural rubber and SBR are merely illustrative and not limiting.

The balanced processing and vulcanization characteristics are most often obtained when free sulfur (elemental sulfur) and a primary accelerator are used with the imide.

Sometimes compounds are both a sulfur donor (and therefore a sulfur vulcanizing agent) and an accelerator, e.g., 2-(morpholinodithio)-benzothiazole. Such compounds can be used with the imides, with or without another sulfur vulcanizing agent and/or another accelerator.

The compounds of the present invention can be used effectively in any sulfur vulcanizable polymer and with any organic accelerating agent.

In addition to other preferred radicals mentioned earlier herein, a preferred form of R is the ethenylene radical.

Preferably when R is a saturated or olefinic divalent cyclic aliphatic radical, it contains 5 to 7 carbon atoms. When R is an arylene radical, preferably it contains 6 to 10 carbon atoms.

While certain representative embodiments and details have been shown for the purpose of illustrating the invention, it will be apparent to those skilled in this art that various changes and modifications may be made therein without departing from the spirit or scope of the invention.

I claim:

1. An imide having the following structural formula

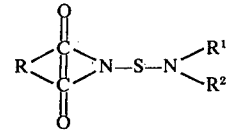

wherein R is selected from the group consisting of 4,5-cyclohexenylene, orthophenylene, ethylene and 1,3-propylene, and

is selected from the group consisting of morpholino, 2,6-dimethylmorpholino, piperidino, diethylamino, diisopropylamino, 3-methylpiperidino, t-butylamino, dicyclohexylamino, N-$\beta$-cyanoethylcyclohexylamino, N-$\beta$-cyanoethyl-t-butylamino, N-$\beta$-cyanoethyl-n-butylamino, N-phenylcyclohexylamino, N-methylanilino, N-ethylanilino, N-ethylbenzylamino, dibenzylamino, N-phenylbenzylamino, N-cyanomethylcyclohexylamino and N-cyanomethyl-n-butylamino.

2. The imide according to claim 1 wherein the imide is selected from the group consisting of N-(morpholinothio)-phthalimide, N-(piperidinothio)-phthalimide and N-(morpholinothio)-cis-$\Delta^4$-tetrahydrophthalimide.

* * * * *